Feb. 27, 1951      E. C. DENCH      2,543,442
ELECTRICAL MULTIPLYING APPARATUS
Filed April 20, 1948
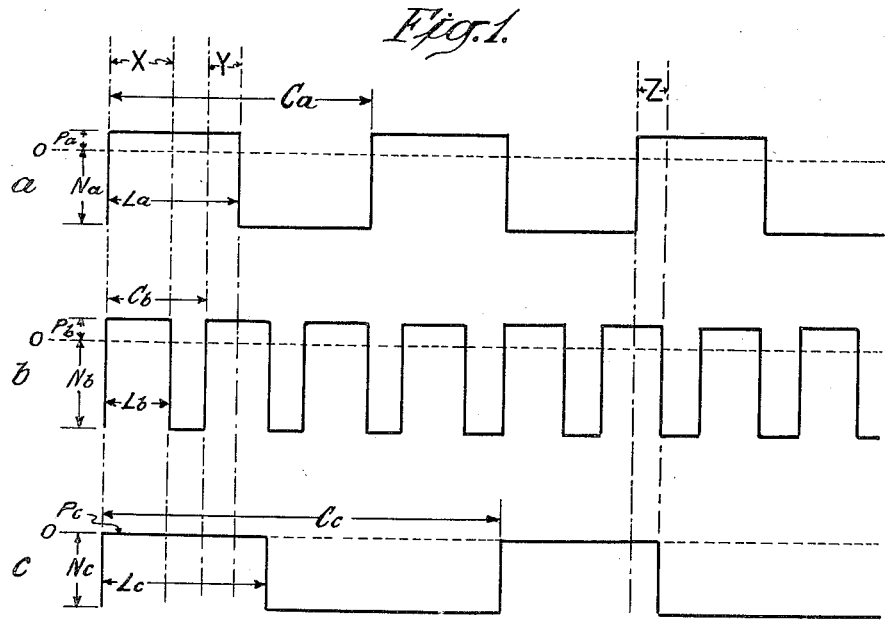
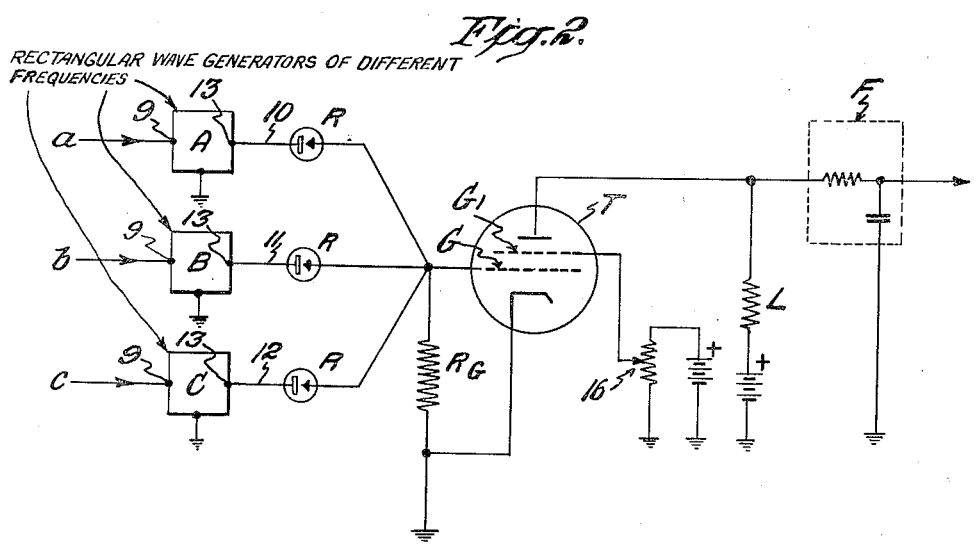
INVENTOR.
Edward C Dench
BY
Byerly, Townsend & Watson
ATTORNEYS Patented Feb. 27, 1951

2,543,442

UNITED STATES PATENT OFFICE 2,543,442

ELECTRICAL MULTIPLYING APPARATUS

Edward C. Dench, Needham, Mass., assignor to Interchemical Corporation, New York, N. Y., a corporation of Ohio Application April 20, 1948, Serial No. 22,113

4 Claims. (Cl. 250—27)

This invention relates to electrical multiplying apparatus of the type in which a product is obtained by measuring the time during which impulses occur simultaneously in a number of trains of rectangular waves in which the effective lengths of the impulses represent the factors to be multipled. A multiplying apparatus of this character is described in Patent No. 2,461,895, issued February 15, 1949, for a joint invention of Arthur C. Hardy and me.

In the multiplying apparatus described in the aforesaid patent, square-wave generators were connected to the grid of a collecting tube by a network which produced on the grid a control voltage equal to a fraction of the sum of the voltages existing in the several trains of square waves and the operation of the tube was such that the flow of plate current was cut off by this control voltage except when voltage impulses of the same polarity existed simultaneously in all the wavetrains produced by the generators.

I have discovered that the flow of current in the collecting tube may be controlled more effectively and with the use of lower voltages, and at the same time all danger of influence of one generator by another may be avoided by connecting the square-wave generators separately to the grid of the collecting tube. In accordance with my invention, the output of each generator is separately connected to the grid of the collecting tube. Rectifiers are inserted in the connections between the generators and the grid and are turned so that they all permit electron flow in the same direction. The grid is connected through a grid resistor to ground or other source of potential and I shall define the normal potential of the grid as that obtaining when no current flows through this resistor.

Whenever there occurs in the train of waves produced by any one of the generators an impulse of the polarity which permits flow of current through the rectifier connected to this generator, the resulting flow of current through the grid resistor changes the voltage on the grid to a value different from its normal voltage. The change is sufficient to permit the flow of plate current in the tube if the normal grid voltage cuts off the flow of current, or to cut off the flow of plate current if the normal grid voltage permits the flow of plate current. The changed condition in the collecting tube occurs whenever any one or more of the generators is producing an impulse of the polarity which causes a flow of current through its rectifier. Consequently, the normal condition of the collecting tube occurs only during such periods as the impulses of the opposite polarity, whose effective lengths represent the factors to be multiplied, occur in all the trains of waves simultaneously. The proportion of time during which the collecting tube is in its normal condition therefore represents the product of the factors. Therefore, the average plate current of the collecting tube represents the product of the factors when flow of plate current indicates the normal condition of the tube or one minus the product of the factors when absence of plate current indicates the normal condition of the tube.

In order that my invention may clearly be understood, I will describe the specific embodiment of it illustrated in the accompanying drawings in which:

Fig. 1 is a diagram showing three trains of rectangular waves; and

Fig. 2 is a circuit diagram of my device for measuring the proportion of the time in which positive impulses occur simultaneously in all the series.

Fig. 1 shows three series of rectangular voltage waves. The frequencies of the three series of waves are different, as indicated by their reciprocals, the cycle lengths $C_a$, $C_b$, $C_c$ in Fig. 1. For accurate results, the three frequencies should be irrationally related.

In each series, the voltage changes abruptly from a negative $N_a$, $N_b$, $N_c$ to a positive or zero value $P_a$, $P_b$, $P_c$. It is not essential in my system that the positive values $P_a$, $P_b$, $P_c$ be equal nor that the negative values $N_a$, $N_b$, $N_c$ be equal, but it is desirable that each of the negative values equals or exceeds the cut-off voltage of the tube T shown in Fig. 2. The base O from which the voltages P and N are measured is the cathode voltage of the tube T, which may conveniently be ground voltage.

The effective length of the positive impulses of the first series, that is, the length $L_a$ of an impulse divided by the length $C_a$ of a cycle, represents a factor $a$ whose value in the instance illustrated is about 0.5. Similarly, a factor $b$ is represented by the effective length of the positive impulses of the second series $$\frac{L_b}{C_b}$$

and is about 0.7, and a third factor $c$ is represented by the effective length of the impulses of the third series $$\frac{L_c}{C_c}$$

and is about 0.4.

The product $abc$ is determined by measuring the proportion of the time during which positive impulses occur simultaneously in all three series. Means for making this determination are shown in the diagram, Fig. 2. A, B and C are rectangular wave generators for producing the trains of waves shown in Fig. 1. They may be of the type shown in Patent No. 2,461,895 or of any known type. The effective lengths of the positive impulses of the generators are determined by control voltages proportional to the factors to be multiplied, connected to the inputs 9 of the generators. Separate conductors 10, 11, 12 connect the outputs 13 of the three generators to the grid G of vacuum tube T. Each of the conductors 10, 11, 12 contains a rectifier R which permits electron flow only towards the grid G. The rectifiers R are most desirably diode rectifiers of the germanium crystal type, having their cathodes connected separately to the outputs of the generators and their anodes connected to the grid G. The grid G is connected to ground through a resistance $R_G$. The circuits connecting the three generators to the grid G and its resistor $R_G$ are thus non-reactive and introduce no time lag. The cathode of the tube T is grounded and the plate circuit of the tube contains a load resistor L connected to a positive potential.

In the operation of the device described, when any one of the rectangular voltage waves is at its negative value $N_a$, $N_b$ or $N_c$, the flow of current through the grid resistor $R_G$ and one of the rectifiers causes a voltage substantially equal to $N_a$, $N_b$ or $N_c$ to appear instantly on the grid G. Each one of these values is sufficient to bias the grid to cut-off so that no plate current flows in the tube when any one or more of the rectangular waves is at its negative value. During time periods when all the rectangular waves are simultaneously positive, such as the time periods X, Y and Z indicated in Fig. 1, there is no flow of current through the grid resistor and therefore no negative bias on the grid G and current flows in the plate circuit of the tube T. The average plate current is, therefore, a measure of the proportion of the time during which positive impulses occur simultaneously in all the trains of rectangular waves, and is, therefore, proportional to the product $abc$. To obtain a signal proportional to the average plate current, and therefore representing this product, a filter F may be introduced as shown in Fig. 2, the time constant being large enough to filter out the frequencies of the trains of rectangular waves and beat frequencies so as to produce a D. C. voltage proportional to the average plate current.

Since the controlling current supplied to the inputs of the generators may be made to vary in any desired way, the device provides means for obtaining the product of three variable factors. If the product of variable factors with a fixed factor is desired, the tube T may be provided with an additional grid $G_1$ whose bias controls the amplitude of the plate current. The bias of the grid $G_1$ may be set so that the amplitude of the plate current is proportional to the fixed factor, while the proportion of the time during which the current flows remains proportional to the product of the variable factors. This makes the average value of the plate current proportional to the product of the variable factors and the fixed factor.

It will be noted that by use of the rectifiers R, an arrangement has been provided in which the output of each generator controls the bias of the grid G independently of the outputs of the other generators. If the negative voltage in each train is at least sufficient to bias the grid of the tube T to cut-off, no other biasing of this grid is required. Furthermore, the output of one generator cannot feed back into, or in any way influence, any one of the other generators. This permits the use of a low-resistance grid resistor so that the resultant low impedance of the circuit permits good wave form reproduction on the grid G.

It will be apparent to those skilled in the art that the specific circuit which has been described may be modified without changing the result obtained. Thus, the factors to be multiplied may be represented by the effective lengths of negative pulses instead of positive pulses; the grid resistor $R_G$ may be connected to any source of positive or negative potential; the rectifiers R may be turned so that they all permit electron flow away from the grid instead of towards the grid; and the product may be represented by the proportion of time during which plate current in the collecting tube is cut off instead of by the proportion of time during which plate current is flowing.

What I claim is:

1. In computing apparatus for obtaining the product of a number of factors, the combination with generators for producing a number of series of rectangular waves of different frequencies and making the effective length of impulses of the same polarity in each series correspond to one of the factors to be multiplied, of means for measuring the percentage of time during which impulses of said polarity occur simultaneously in all the series comprising non-reactive circuits for applying the impulses of the opposite polarity occurring in each series to the grid of a common collector tube.

2. In computing apparatus for obtaining the product of a number of factors, the combination with generators for producing a number of series of rectangular waves of different frequencies and making the effective length of impulses of the same polarity in each series correspond to one of the factors to be multiplied, of means for measuring the percentage of time during which impulses of said polarity occur simultaneously in all the series comprising an electronic tube having a control grid and non-reactive circuits for applying to the control grid the impulses of the opposite polarity occurring in each series.

3. In computing apparatus for obtaining the product of a number of factors, the combination with generators for producing a number of series of rectangular waves of different frequencies and making the effective length of impulses of the same polarity in each series correspond to one of the factors to be multiplied, of means for measuring the percentage of time during which impulses of said polarity occur simultaneously in all the series comprising an electronic tube having a control grid, a grid resistor, and non-reactive circuits containing rectifiers connecting each generator with the grid resistor.

4. In computing apparatus for obtaining the product of a number of factors, the combination with generators for producing a number of series of rectangular waves of different frequencies and making the effective length of impulses of the same polarity in each series correspond to one of the factors to be multiplied, of means for measuring the percentage of time during which impulses of said polarity occur simultaneously in all the series comprising an electronic tube having a control grid, a grid resistor, non-reactive circuits connecting each generator with the grid resistor, and rectifiers in said circuits all turned to permit electron flow in the same direction.

EDWARD C. DENCH.

REFERENCES CITED

The following references are of record in the file of this patent:

UNITED STATES PATENTS

| Number | Name | Date |
|---|---|---|
| 2,227,906 | Kellog | Jan. 7, 1941 |
| 2,266,401 | Reeves | Dec. 16, 1941 |
| 2,329,048 | Hullegard | Sept. 7, 1943 |
| 2,414,541 | Madsen | Jan. 21, 1947 |
| 2,436,963 | Grassdoff | Mar. 2, 1948 |